(12) United States Patent
Oh et al.

(10) Patent No.: US 7,443,704 B2
(45) Date of Patent: Oct. 28, 2008

(54) AC HIGH VOLTAGE DETECTING DEVICE

(76) Inventors: Chul-woo Oh, 101, 1289-2, Gwonseon-dong, Gwonseon-gu, Suwon-si, Gyeonggi-do (KR); Jong-hwa Cho, 103-1904, Punglim Aiwon Apartment, Yeongtong 3rd, 1093, Yeongtong-dong, Yeongtong-gu, Suwon-si, Gyeonggi-do (KR)

( * ) Notice: Subject to any disclaimer, the term of this patent is extended or adjusted under 35 U.S.C. 154(b) by 180 days.

(21) Appl. No.: 11/357,137

(22) Filed: Feb. 21, 2006

(65) Prior Publication Data
US 2007/0014131 A1    Jan. 18, 2007

(30) Foreign Application Priority Data
Jul. 15, 2005  (KR) ............... 10-2005-0063975

(51) Int. Cl.
*H02M 7/25* (2006.01)
(52) U.S. Cl. ............... 363/61; 363/146; 324/107
(58) Field of Classification Search ......... 363/141–146, 363/125–126, 37, 39, 41; 323/222, 267, 323/272; 324/142, 111, 107, 166
See application file for complete search history.

(56) References Cited
U.S. PATENT DOCUMENTS
6,236,584 B1 *  5/2001  Koo ............... 363/143

FOREIGN PATENT DOCUMENTS

| JP | 2-41280 | 2/1990 |
|----|---------|--------|
| JP | 2-156163 | 6/1990 |
| JP | 5-193235 | 8/1993 |
| KR | 2004-3712 | 1/2004 |

OTHER PUBLICATIONS

Chinese Office Action dated Apr. 4, 2008 issued in CN 2006-10105632.X.

* cited by examiner

*Primary Examiner*—Rajnikant B Patel
(74) *Attorney, Agent, or Firm*—Stanzione & Kim, LLP

(57) ABSTRACT

An AC high voltage detecting device includes a high voltage power supply (HVPS) to convert a low voltage into an AC high voltage, a rectifier to rectify the converted AC high voltage into a positive voltage and a negative voltage, a voltage divider to divide the rectified positive voltage and the rectified negative voltage into a first voltage and a second voltage, respectively; and a detector to read out a sum component of the first and the second voltages to detect the AC high voltage in a DC level. Since the AC high voltage supplied from the high voltage power supply is detected after being converted into a DC voltage, there is no variance caused due to various devices required to detect an AC voltage.

20 Claims, 4 Drawing Sheets

AC HIGH VOLTAGE DETECTING DEVICE

CROSS-REFERENCE TO RELATED APPLICATIONS

This application claims benefit under 35 U.S.C. § 119 from Korean Patent Application No. 2005-63975, filed Jul. 15, 2005, the disclosure of which is incorporated herein in its entirety.

BACKGROUND OF THE INVENTION

1. Field of the Invention

The present general inventive concept relates to an AC high voltage detecting device usable with an image forming apparatus using a non-contact developing method. More particularly, the present general inventive concept relates an AC high voltage detecting device which converts an AC high voltage supplied from a high voltage power supply of an image forming apparatus into a DC voltage to detect the AC voltage.

2. Description of the Related Art

An image forming apparatus prints an image corresponding to input original image data on a recording medium, such as paper. Examples of the image forming apparatus are printers, photocopiers, and facsimile machines. Laser beam printers, LED print head printers, and facsimile machines adopt an electrophotographic method to print an image. The image forming apparatus prints an image through a series of processes, i.e., charging, exposure, developing, transferring, and fixing.

FIG. 1 is a view illustrating a conventional image forming apparatus.

Referring to FIG. 1, the conventional image forming apparatus has an organic photoconductive drum (OPC) 10, a charging roller 20, a laser scanning unit (LSU) 30, a developing roller 40, a transfer roller 50, a controller 60, and a high voltage power supply (HVPS) 70.

A printing operation of the conventional image forming apparatus is performed as follows. The HVPS 70 supplies predetermined voltages to the charging roller 20, the developing roller 40, and the transfer roller 50 under the control of the controller 60. The charging roller 20 charges a surface of the OPC 10 with a charging voltage supplied from the HVPS 70.

The laser scanning unit 30 scans the OPC 10 with light corresponding to image data input from the controller 60 and thereby forms an electrostatic latent image on the surface of the OPC 10. The electrostatic latent image formed on the surface of the OPC 10 is converted into a toner image by toner supplied from the developing roller 40.

The transfer roller 50, which is driven by a transfer voltage supplied from the HVPS 70, transfers the toner image from the OPC 10 to paper. A fixing roller (not shown) fixes the toner image onto the paper with high temperature heat and pressure, and the paper is discharged from the image forming apparatus in a discharge direction. Through the above described processes, the printing operation is completed.

FIG. 2 is a view illustrating a conventional AC high voltage detecting device.

Referring to FIG. 2, the conventional AC high voltage detecting device has a high voltage power supply (HVPS) 70, a high voltage probe 81, and an oscilloscope 82.

The HVPS 70 has a pulse width modulation (PWM) input unit 71, a comparator 72, a switching unit 73, and a transformer 74. The HVPS 70 is an essential component for photocopiers, laser beam printer, and facsimile machines, as described above, and the HVPS 70 instantly converts a low voltage of 12-24V into a high voltage from several hundreds to several thousands of volts and forms a high voltage discharge on a drum of a printer or a photocopier, such that the printer can use the high voltage to print a document.

The high voltage probe 81 receives the AC high voltage from the transformer 74, converts the high voltage into a voltage that is readable by the oscilloscope 82, and outputs the converted voltage. The high voltage probe 81 reduces the received AC high voltage to a voltage approximately $\frac{1}{1000}$ of the received AC high voltage.

However, the conventional high voltage detecting apparatus is likely to cause an error in sensing the high voltage due to an error that occurs by the oscilloscope 82 and the high voltage probe 81 when an AC voltage waveform is detected at an AC output terminal of the HVPS 70. The occurrence of the error varies setting values and thus deteriorates image quality in the image forming apparatus. Also, a time for restoring the varied setting values is additional required, which causes inefficiency of the image forming apparatus.

SUMMARY OF THE INVENTION

The present general inventive concept provides an AC high voltage detecting device which detects a voltage after converting an AC high voltage supplied from a high voltage power supply of an image forming apparatus into a DC voltage.

Additional aspects and utilities of the present general inventive concept will be set forth in part in the description which follows and, in part, will be obvious from the description, or may be learned by practice of the general inventive concept.

The foregoing and/or other aspects of the present general inventive concept are achieved by providing an AC high voltage detecting device including a high voltage power supply (HVPS) to convert a low voltage into an AC high voltage, a rectifier to rectify the converted AC high voltage into a positive voltage and a negative voltage, a voltage divider to divide the rectified positive voltage and the rectified negative voltage into a first voltage and a second voltage, respectively, and a detector to read out a sum component of the first and the second voltages to detect the AC high voltage in a DC level.

The rectifier may include a first rectifier including a first diode and a first capacitor to rectify the AC high voltage supplied from the HVPS into the positive voltage, and a second rectifier including a second diode and a second capacitor to rectify the AC high voltage into the negative voltage, the second diode being in an opposite direction to the first diode.

The voltage divider may divide each of the rectified positive voltage and the rectified negative voltage according to a predetermined ratio such that the first and the second voltages fall within a detectable range of the detector.

The detector may include a digital voltage meter (DVM).

The foregoing and/or other aspects of the present general inventive concept are also achieved by providing an image forming apparatus using an AC high voltage detecting device including a high voltage power supply (HVPS) to convert a low voltage into an AC high voltage, a rectifier to rectify the converted AC high voltage into a positive voltage and a negative voltage, a voltage divider to divide the rectified positive voltage and the rectified negative voltage into a first voltage and a second voltage, respectively, and a detector to read out a sum component of the first and the second voltages to detect the AC high voltage in a DC level.

The foregoing and/or other aspects of the present general inventive concept are also achieved by providing an AC high voltage detecting device usable with an image forming apparatus to detect a voltage level of an AC high voltage generated by a high voltage power supply (HVPS), including an AC-DC converter to convert the AC high voltage into a DC voltage, and a detector to detect a voltage level of the DC voltage and to determine the voltage level of the AC high voltage based on the detected voltage level of the DC voltage.

The foregoing and/or other aspects of the present general inventive concept are also achieved by providing an AC high voltage detecting device usable with an image forming apparatus to detect a voltage level of an AC high voltage generated by a high voltage power supply (HVPS), including a rectifying unit to rectify the AC high voltage into one or more DC voltages, a dividing unit to divide the one or more DC voltages according to a predetermined ratio, and a detecting unit to detect voltage levels of the reduced one or more DC voltages and to determine the voltage level of the AC high voltage based on the detected voltage level of the reduced one or more voltages.

The foregoing and/or other aspects of the present general inventive concept are also achieved by providing an image forming apparatus, including an electrophotographic image forming unit to form an image, a high voltage power supply (HVPS) to convert a low voltage into an AC high voltage and to output the AC high voltage to the electrophotographic image forming unit, an AC high voltage detecting unit to detect a voltage level of the AC high voltage output from the HVPS, including an AC-DC converter to convert the AC high voltage to a DC voltage and a detector to detect a voltage level of the DC voltage and to determine the voltage level of the AC high voltage based on the detected voltage level of the DC voltage.

The foregoing and/or other aspects of the present general inventive concept are also achieved by providing a method of detecting a voltage level of an AC high voltage output from a high voltage power supply (HVPS), including converting the AC high voltage into one or more DC voltages, dividing each of the one or more DC voltages according to a predetermined ratio, and detecting voltage levels of the divided one or more DC voltages and determining the voltage level of the AC high voltage based on the detected voltage levels of the divided one or more DC voltages.

BRIEF DESCRIPTION OF THE DRAWINGS

These and/or other aspects of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
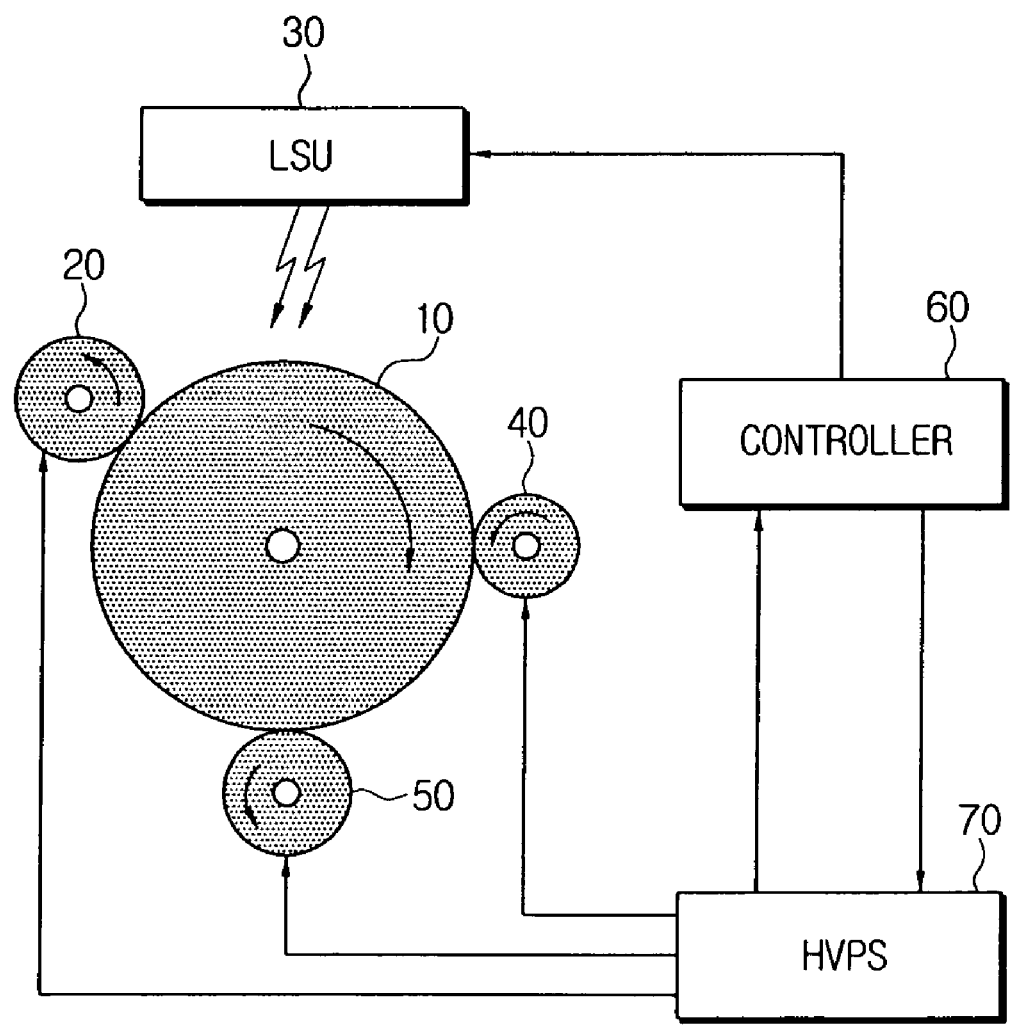
FIG. 1 is a schematic view illustrating a conventional image forming apparatus.
Figure 2:
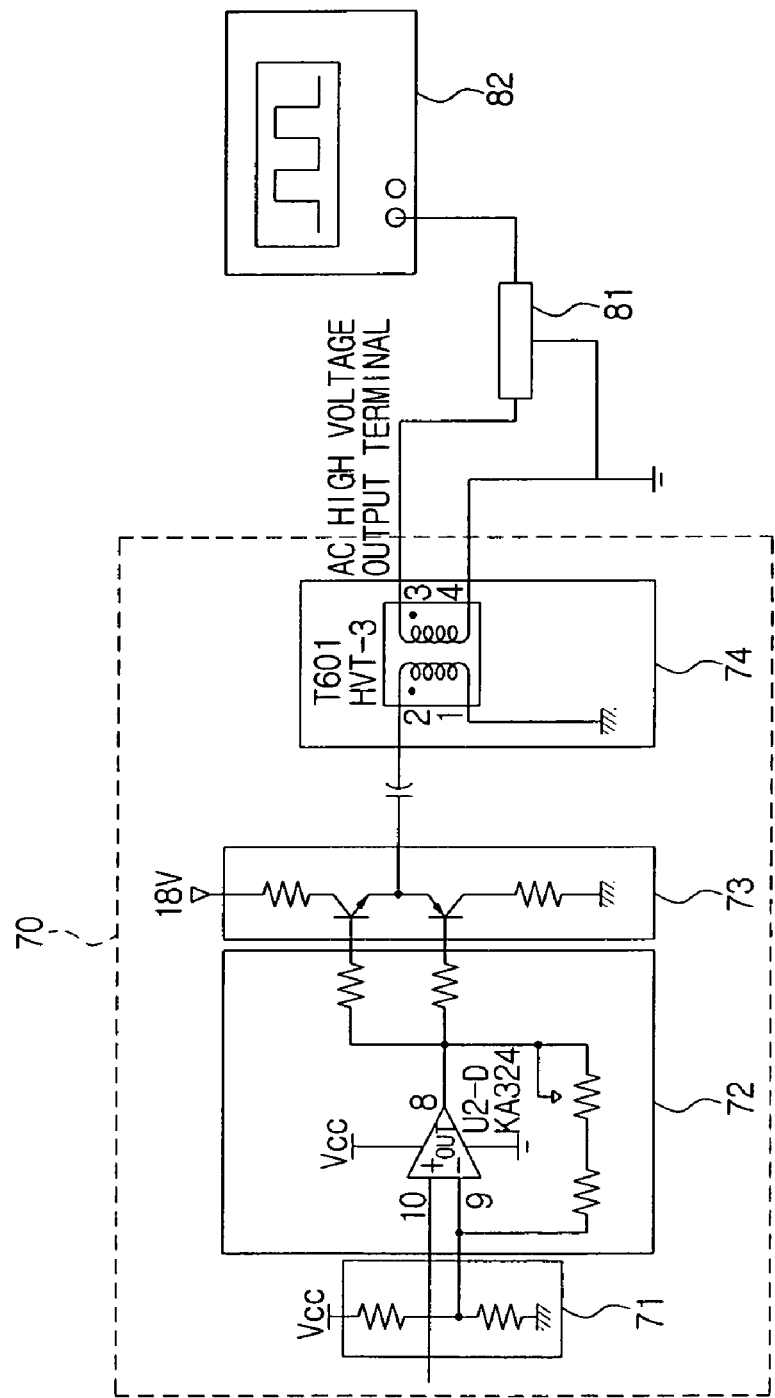
FIG. 2 is a circuit diagram illustrating a conventional AC high voltage detecting device.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the FIGures.

Figure 3:
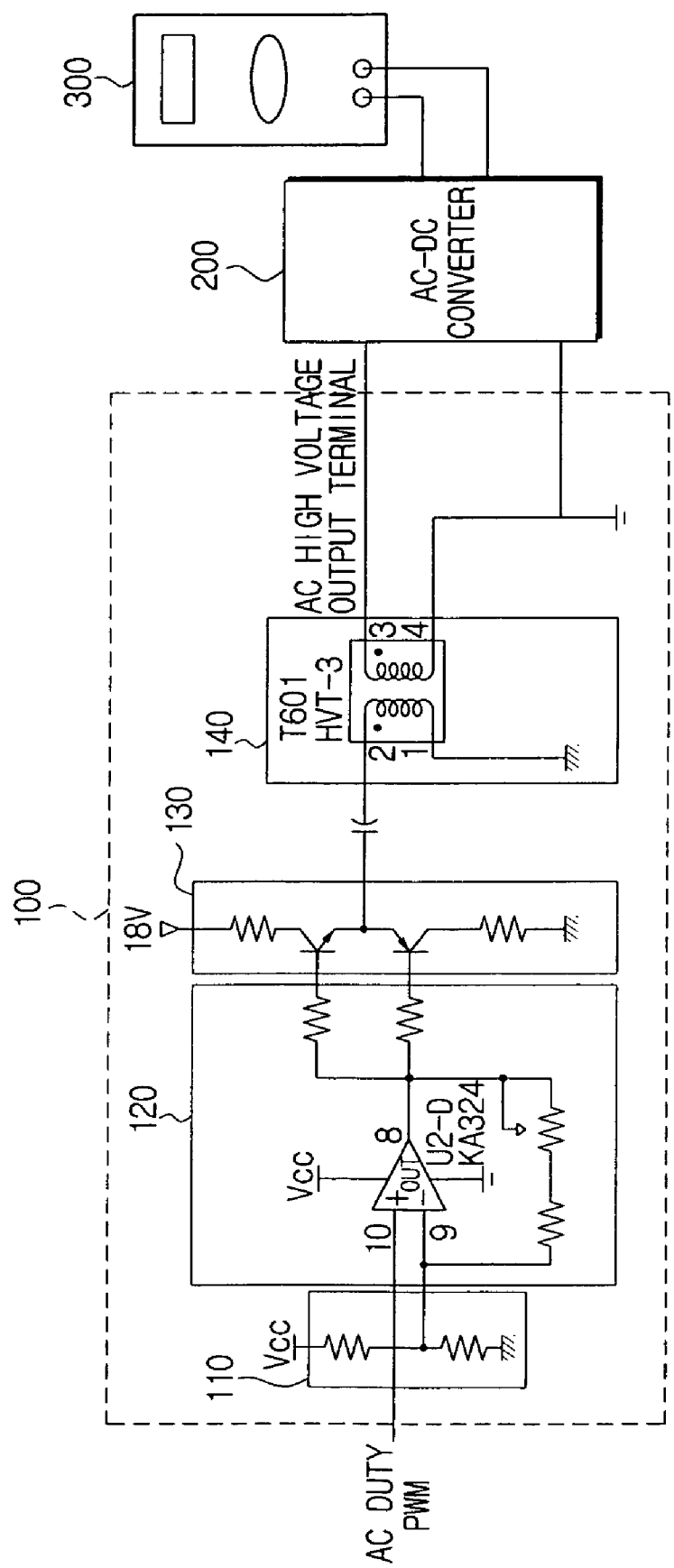
FIG. 3 is a circuit diagram illustrating an AC high voltage detecting device according to an embodiment of the present general inventive concept.

FIG. 3 is a circuit diagram illustrating an AC high voltage detecting device according to an embodiment of the present general inventive concept.

Referring to FIG. 3, the AC high voltage detecting device includes a high voltage power supply (HVPS) 100, an AC-DC converter 200, and a detector 300.

The HVPS 100 includes a pulse width modulation (PWM) input unit 110, comparator 120, a switching control unit 130, and a transformer 140. The HVPS 100 converts a low voltage into a high voltage of several hundreds to several thousands of volts and thereby can form a high voltage discharge on a drum of an image forming apparatus. The high voltage supplied from the HVPS 100 is an AC high voltage which is usable in an image forming apparatus using a non-contact developing method of laser beam printing (LBP).

The PWM input unit 110 receives a PWM signal from an engine controller (not shown). The PWM signal determines a level of an output voltage based on a duty ratio of the PWM signal.

The comparator 120 compares the PWM signal input to the PWM input unit 110 with a reference signal, generates a transistor driving signal according to the comparison result, and outputs the transistor driving signal to the switching controller 130. The transistor driving signal output from the comparator 120 has the same waveform as that of the PWM signal.

The switching controller 130 switches on/off a transistor based on the transistor driving signal output from the comparator 120. That is, if the PWM signal is greater than the reference signal, a transistor connected to a terminal of an 18V power supply switches on, and if the PWM signal is less than the reference signal, a grounded transistor switches on.

The transformer 140 transforms a voltage of a primary coil according to the switching on/off operations of the transistors of the switching controller 130. The voltage change of the primary coil causes a voltage to be applied to a secondary coil of the transformer 140 conFIG.ured to have a large number of turns. The transformer 140 is serially resonant according to the switching on/off operations of the transistors, thereby generating an alternating current signal. Accordingly, an alternating current voltage having a high electric potential is applied to the secondary coil of the transformer 40, and an AC high voltage output terminal of the transformer 140 outputs the AC high voltage.

The AC-DC converter 200 is connected to the AC high voltage output terminal of the transformer 140, and converts the AC high voltage into a DC voltage. The AC-DC converter 200 outputs the DC voltage and the detector 300 detects the output DC voltage.

Figure 4:
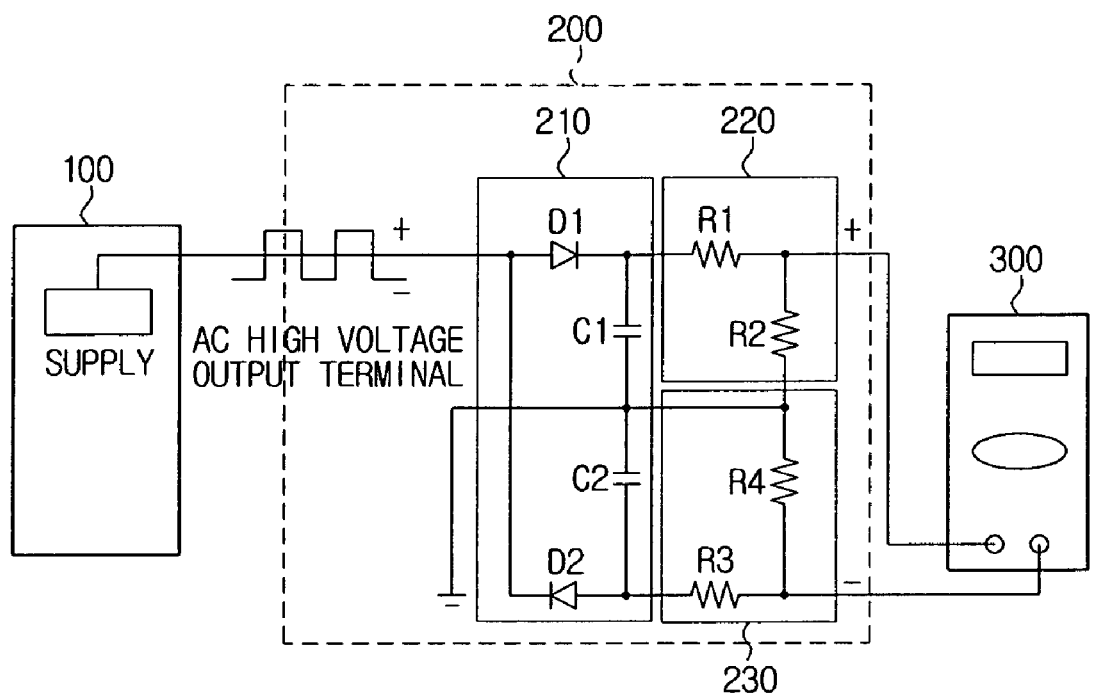
FIG. 4 is a circuit diagram illustrating an AC-DC converter and a detector of the AC high voltage detecting device of FIG. 3.

FIG. 4 is a circuit diagram illustrating the AC-DC converter 200 and the detector 300 of the AC high voltage detecting device of FIG. 3.

Referring to FIG. 4, the AC-DC converter 200 includes a rectifier 210, a first voltage divider 220, and a second voltage divider 230.

The rectifier 210 comprises first and second diodes D1 and D2 and first and second capacitors C1 and C2, and rectifies the AC high voltage supplied from the HVPS 100 into a positive (+) voltage and a negative (−) voltage. That is, a circuit interconnecting the first diode D1 and the first capacitor C1 rectifies the input AC high voltage into the positive (+) voltage and outputs the positive (+) voltage to the first voltage divider 220. A circuit interconnecting the second diode D2 arranged opposite to the first diode D1 and the second capacitor C2 rectifies the input AC high voltage into the negative (−) voltage and outputs the negative (−) to the second voltage divider 230.

The first voltage divider 220 includes a first resistor R1 and a second resistor R2, and outputs the rectified positive (+) voltage as a reduced positive (+) DC voltage according to a predetermined ratio of R1 to R2. The second voltage divider 230 includes a third resistor R3 and a fourth resistor R4, and outputs the rectified negative (−) voltage as a reduced negative (−) DC voltage according to a predetermined ratio of R3 to R4.

The first resistor R1 of the first voltage discharger 220 can be set to a value relatively less than the second resistor R2, and the third resistor R3 of the second voltage divider 230 can be set to a value relatively less than the fourth resistor R4, such that the high voltage rectified by the rectifier 210 is reduced to be in an allowable range of the detector 300.

The detector 300 reads out a sum component of the reduced positive (+) and negative (−) DC voltages respectively output from the first voltage divider 220 and the second voltage divider 230. Accordingly, the detector 300 can detect an output voltage having an AC voltage component in a DC level of a predetermined ratio, without requiring an extra detecting device, such as an oscilloscope or a high voltage probe. The detector 300 may be a digital voltage meter (DVM).

According to the present general inventive concept as described above, since voltage detection is performed by converting an AC high voltage supplied from an HVPS into a DC voltage, an extra device dedicated to detecting the AC high voltage is not required and thus setting values are prevented from varying due to the extra device. Accordingly, image degradation is prevented in an image forming apparatus using an AC high voltage detecting device according to an embodiment of the present general inventive concept.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An AC high voltage detecting device comprising:
   a high voltage power supply (HVPS) to convert a low voltage into an AC high voltage;
   a rectifier to rectify the converted AC high voltage into a positive voltage and a negative voltage;
   a voltage divider to divide the rectified positive voltage and the rectified negative voltage into a first voltage and a second voltage, respectively; and
   a detector to read out a sum component of the first and the second voltages to detect the AC high voltage in a DC level.

2. The AC high voltage detecting device as claimed in claim 1, wherein the rectifier comprises:
   a first rectifier including a first diode and a first capacitor to rectify the AC high voltage supplied from the HVPS into the positive voltage; and
   a second rectifier including a second diode and a second capacitor to rectify the AC high voltage into the negative voltage, the second diode being in an opposite direction to the first diode.

3. The AC high voltage detecting device as claimed in claim 1, wherein the voltage divider divides each of the rectified positive voltage and the rectified negative voltage according to a predetermined ratio such that the first and the second voltages fall within a detectable range of the detector.

4. The AC high voltage detecting device as claimed in claim 1, wherein the detector comprises a digital voltage meter (DVM).

5. An image forming apparatus using an AC high voltage detecting device comprising:
   a high voltage power supply (HVPS) to convert a low voltage into an AC high voltage;
   a rectifier to rectify the converted AC high voltage into a positive voltage and a negative voltage;
   a voltage divider to divide the rectified positive voltage and the rectified negative voltage into a first voltage and a second voltage, respectively; and
   a detector to read out a sum component of the first and the second voltages to detect the AC high voltage in a DC level.

6. An AC high voltage detecting device usable with an image forming apparatus to detect a voltage level of an AC high voltage generated by a high voltage power supply (HVPS), comprising:
   an AC-DC converter to convert the AC high voltage into a DC voltage; and
   a detector to detect a voltage level of the DC voltage as a sum component of a first and a second voltage of the AC-DC converter and to determine the voltage level of the AC high voltage based on the detected voltage level of the DC voltage.

7. The AC high voltage detecting device as claimed in claim 6, wherein the AC-DC converter comprises:
   a rectifier to convert the AC high voltage into a positive DC voltage and a negative DC voltage;
   a first voltage divider to reduce the positive DC voltage according to a predetermined ratio such that the reduced positive DC voltage falls within a detectable range of the detector; and
   a second voltage divider to reduce the negative DC voltage according to the predetermined ratio such that the reduced negative voltage falls within the detectable range of the detector.

8. The AC high voltage detecting device as claimed in claim 7, wherein:
   the first voltage divider comprises a first resistor having a first resistance and a second resistor having a second resistance to reduce the positive DC voltage by a ratio of the first and second resistances; and
   the second voltage divider comprises a third resistor having a third resistance and a fourth resistor having a fourth resistance to reduce the negative DC voltage by a ratio of the third and fourth resistances.

9. The AC high voltage detecting device as claimed in claim 8, wherein the first resistance is less than the second resistance, and the third resistance is less than the fourth resistance.

10. The AC high voltage detecting device as claimed in claim 7, wherein the detector calculates a sum of the reduced positive DC voltage and the reduced negative DC voltage, and determines the voltage level of the AC voltage based on the calculated sum.

11. An AC high voltage detecting device usable with an image forming apparatus to detect a voltage level of an AC high voltage generated by a high voltage power supply (HVPS), comprising:
   a rectifying unit to rectify the AC high voltage into one or more DC voltages;
   a dividing unit to divide the one or more DC voltages according to a predetermined ratio; and
   a detecting unit to detect voltage levels of the divided one or more DC voltages as a sum of a first voltage and a second voltage of the dividing unit and to determine the voltage level of the AC high voltage based on the detected voltage level of the divided one or more voltages.

12. The AC high voltage detecting device as claimed in claim 11, wherein the rectifying unit comprises:
    a first diode and a first capacitor to rectify the AC high voltage into a positive DC voltage; and
    a second diode disposed in an opposite direction to the first diode and a second capacitor to rectify the AC high voltage into a negative DC voltage.

13. The AC high voltage detecting device as claimed in claim 12, wherein the dividing unit comprises:
    first and second resistors to divide the positive DC voltage according to a ratio of resistances thereof; and
    third and fourth resistors to divide the negative DC voltage according to a ratio of the resistances thereof.

14. The AC high voltage detecting device as claimed in claim 13, wherein the ratio of the resistances of the first and second resistors is equal to the ratio of the resistances of the third and fourth resistors.

15. The AC high voltage detecting device as claimed in claim 11, wherein the detector determines a sum of the voltage values of the divided one or more DC voltages and determines the voltage level of the AC high voltage based on the determined sum.

16. An image forming apparatus, comprising:
    an electrophotographic image forming unit to form an image;
    a high voltage power supply (HVPS) to convert a low voltage into an AC high voltage and to output the AC high voltage to the electrophotographic image forming unit;
    an AC high voltage detecting unit to detect a voltage level of the AC high voltage output from the HVPS, including an AC-DC converter to convert the AC high voltage to a DC voltage and a detector to detect a voltage level of the DC voltage as a sum of first and second voltages of the AC-DC converter and to determine the voltage level of the AC high voltage based on the detected voltage level of the DC voltage.

17. A method of detecting a voltage level of an AC high voltage output from a high voltage power supply (HVPS), comprising:
    converting the AC high voltage into one or more DC voltages;
    dividing each of the one or more DC voltages according to a predetermined ratio; and
    detecting voltage levels of the divided one or more DC voltages as a sum of a first voltage and a second voltage of the divided one or more DC voltages and determining the voltage level of the AC high voltage based on the detected voltage levels of the divided one or more DC voltages.

18. The method as claimed in claim 17, wherein the converting of the AC high voltage comprises:
    rectifying the AC high voltage into a positive DC voltage and a negative DC voltage.

19. The method as claimed in claim 18, wherein the dividing of each of the one or more DC voltages according to a predetermined ratio comprises:
    reducing each of the positive DC voltage and the negative DC voltage according to the predetermined ratio to be in a detectable range.

20. The method as claimed in claim 19, wherein the detecting of the voltage levels of the divided one or more DC voltages and determining the voltage level of the AC high voltage comprises:
    detecting the voltage levels of the reduced positive DC voltage and the reduced negative DC voltage;
    calculating a sum component of the voltage levels of the reduced positive DC voltage and the reduced negative DC voltage; and
    determining the voltage level of the AC high voltage based on the calculated sum component of the voltage levels of the reduced positive DC voltage and the reduced negative DC voltage.

* * * * *